(12) United States Patent
van Zelst et al.

(10) Patent No.: US 7,792,208 B2
(45) Date of Patent: Sep. 7, 2010

(54) PILOT TONES IN A MULTI-TRANSMIT OFDM SYSTEM USABLE TO CAPTURE TRANSMITTER DIVERSITY BENEFITS

(75) Inventors: Albert van Zelst, Woerden (NL); Vincent K. Jones, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 12/119,268

(22) Filed: May 12, 2008

(65) Prior Publication Data

US 2008/0279306 A1 Nov. 13, 2008

Related U.S. Application Data

(63) Continuation of application No. 11/187,603, filed on Jul. 21, 2005, now Pat. No. 7,372,913.

(60) Provisional application No. 60/590,615, filed on Jul. 22, 2004.

(51) Int. Cl.
*H04B 7/08* (2006.01)

(52) U.S. Cl. ...................................... 375/267
(58) Field of Classification Search ................ 375/147, 375/148, 150, 152, 260, 267, 343, 347; 370/208, 370/210, 320, 335, 342
See application file for complete search history.

(56) References Cited

U.S. PATENT DOCUMENTS

| | | | |
|---|---|---|---|
| 4,481,658 A | 11/1984 | Schmidt | |
| 2002/0122381 A1 | 9/2002 | Wu et al. | |
| 2002/0136176 A1 | 9/2002 | Abeta et al. | |
| 2003/0026349 A1* | 2/2003 | Onggosanusi et al. | ........ 375/267 |
| 2003/0072254 A1 | 4/2003 | Ma et al. | |

(Continued)

OTHER PUBLICATIONS

International Search Report & Written Opinion mailed Jul. 13, 2006 for PCT Application Serial No. PCT/US05/026058, 9 pages.

*Primary Examiner*—Young T. Tse
(74) *Attorney, Agent, or Firm*—Turocy & Watson, LLP

(57) ABSTRACT

In a wireless transmitter having a plurality of spatial streams differentiable at a receiver, wherein data is encoded and transmitted over a communication channel with pilot tones to provide the receiver with information about the effects of the communication channel and/or transmitter impairments and/or receiver impairments on the spatial streams transmitted, the benefits can be provided by identifying a plurality of symbol periods within which symbols representing some of the encoded data are to be transmitted, identifying pilot tone values for the plurality of symbol periods, wherein the identified pilot tone values are such that the receiver, when receiving at least some of the pilot tones having the identified pilot tone values, is provided with signals enabling the receiver to characterize the communication channel and/or transmitter impairments and/or receiver impairments to obtain transmit stream diversity gain, and transmitting the symbols and the pilot tones over the plurality of spatial streams for the plurality of symbol periods. In some embodiments, the pilot tones are orthogonal over space and time or over space and time and frequency, while in others they are semi-orthogonal. Pilot tone values might be of a constant amplitude and phase shifted, or might also have amplitude variations wherein at least two pilot tones are nonzero for spatial streams for a given symbol period.

20 Claims, 4 Drawing Sheets

U.S. PATENT DOCUMENTS

2005/0111599 A1* 5/2005 Walton et al. ............... 375/347
2005/0152326 A1   7/2005 Vijayan et al.
2005/0281242 A1* 12/2005 Sutivong et al. ............ 370/344
2006/0018287 A1   1/2006 Walton et al.
2006/0291371 A1* 12/2006 Sutivong et al. ............ 370/208

* cited by examiner

4(a) $\begin{bmatrix} 1 & 1 \\ 1 & -1 \end{bmatrix}$

4(b) $\begin{bmatrix} 1 & 1 & 1 & 1 \\ 1 & -1 & 1 & -1 \\ 1 & 1 & -1 & -1 \end{bmatrix}$ 4(c) $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ 4(d) $\begin{bmatrix} 1 & 1 & 1 & 1 \\ 1 & -1 & 1 & -1 \\ 1 & j & -1 & -j \\ 1 & -j & -1 & j \end{bmatrix}$

PILOT TONES IN A MULTI-TRANSMIT OFDM SYSTEM USABLE TO CAPTURE TRANSMITTER DIVERSITY BENEFITS

CROSS-REFERENCE TO RELATED APPLICATIONS

This application claims priority from U.S. Provisional Patent Application No. 60/590,615 filed Jul. 22, 2004 entitled "Pilot Tone in a Multi-Transmit OFDM System Usable to Capture Transmitter Diversity Gains", and is a continuation of Application No. from U.S. patent application Ser. No. 11/187,603 filed on Jul. 21, 2005, now U.S. Pat. No. 7,372,913, which are hereby incorporated by reference, as if set forth in full in this document, for all purposes.

FIELD OF THE INVENTION

The present invention relates to wireless transmission in general and in particular to wireless transmissions using multiple spatial streams and pilot tones.

BACKGROUND OF THE INVENTION

With OFDM systems, such as those used for 802.11 protocol transmissions, pilot tones are used to assist with transmission and reception. With MIMO systems, or multi-transmit systems, additional complexities arise. MIMO systems can provide transmit diversity gains. With simple wireless transmitters using single transmit spatial streams on single transmit antennas, such benefits are not obtained and even with some pilot tone schemes, some of the benefits might not be obtained.

In a MIMO system, pilot tones might be transmitted using multiple transmit spatial streams by cycling through spatial streams, but then spectral flatness becomes an issue and pilot tracking might fail if there is fading on the spatial stream that happens to be carrying the pilot tone at the time.

BRIEF SUMMARY OF THE INVENTION

An embodiment of a transmitter using a plurality of transmit antennas provides for pilot tones that are usable to capture transmitter diversity benefits.

In a wireless transmitter having a plurality of spatial streams differentiable at a receiver, wherein data is encoded and transmitted over a communication channel with pilot tones to provide the receiver with information about the effects of the communication channel and/or transmitter impairments and/or receiver impairments on the spatial streams transmitted, the benefits can be provided by identifying a plurality of symbol periods within which symbols representing some of the encoded data are to be transmitted, identifying pilot tone values for the plurality of symbol periods, wherein the identified pilot tone values are such that the receiver, when receiving at least some of the pilot tones having the identified pilot tone values, is provided with signals enabling the receiver to characterize the communication channel to obtain transmit stream diversity benefits, and transmitting the symbols and the pilot tones over the plurality of spatial streams for the plurality of symbol periods. In some embodiments, the pilot tones are orthogonal over space and time or over space and time and frequency, while in others they are semi-orthogonal. Pilot tone values might be of a constant amplitude and phase shifted, or might also have amplitude variations wherein at least two pilot tones are non-zero for spatial streams for a given symbol period.

The following detailed description together with the accompanying drawings will provide a better understanding of the nature and advantages of the present invention.

BRIEF DESCRIPTION OF THE DRAWINGS

FIG. 4(*a*) is 2×2 Walsh-Hadamard (WH) matrix; FIG. 4(*b*) is a 3×4 matrix that might be used with three transmit spatial streams over four symbol periods; FIG. 4(*c*) is a 4×4 matrix that might be used with four transmit spatial streams over four symbol periods; FIG. 4(*d*) is an alternative 4×4 matrix.

DETAILED DESCRIPTION OF THE INVENTION

In embodiments of MIMO or multi-transmit systems, multiple transmitter antennas are used to convey a bit sequence. By transmitting over multiple transmit antennas, benefits of transmit diversity can be obtained. With diversity of pilot tones, signal fading can be better accommodated. It should be understood that, unless otherwise specified, the methods and apparatus described herein work where the receiver is a single antenna receiver or a multiple antenna receiver.

Throughout this disclosure, where there are multiple instances of an object and the number of instances is not critical, the instances are numbered from "1" to "n" with the understanding that the value of "n" need not be identical from use to use. For example, "n" is used as the number of antennas in various places, but that number might vary from example to example. It should also be understood that nothing here requires that all instances be used. For example, the transmitter illustrated in FIG. 1 might be designed with ten antennas, but only seven of which are being used. This may be for power saving purposes, because they are not needed when a channel is good. Thus, "n" might take on different values in different contexts. In the above example, n=10 if all antennas are counted, whereas n=7 if only active antennas are counted. The number of antennas can be from one to twenty, or more than twenty.

In some places, $N_t$ is used to indicate the number of transmit antennas/transmit spatial streams and $N_r$ is used to indicate the number of receive antennas/receive spatial streams. Without loss of generality, many of the examples herein assume a direct mapping from number of spatial information streams at the transmitter ($N_s$) to the number of transmit antennas ($N_t$), i.e., $N_s=N_t$, and where one value is used, the other can be used, unless otherwise indicated. It should be understood that, when $N_s$ is not equal to $N_t$, the pilot mapping could still be applied based on $N_t$ transmit antennas through direct mapping (i.e., spatial multiplexing), or to the number of spatial streams by using the same spatial mapping as applied to the data to map the $N_s$ spatial streams on the $N_t$ transmit antennas.

It should be understood throughout this disclosure that the lines shown in the figures could be digital signal lines for communicating a time sequence of complex valued quantities. It should be further understood that operator objects such as summers might be complex summers. In other cases, the signals communicated might be analog signals, control signals or streams of one or more values.

Figure 1:
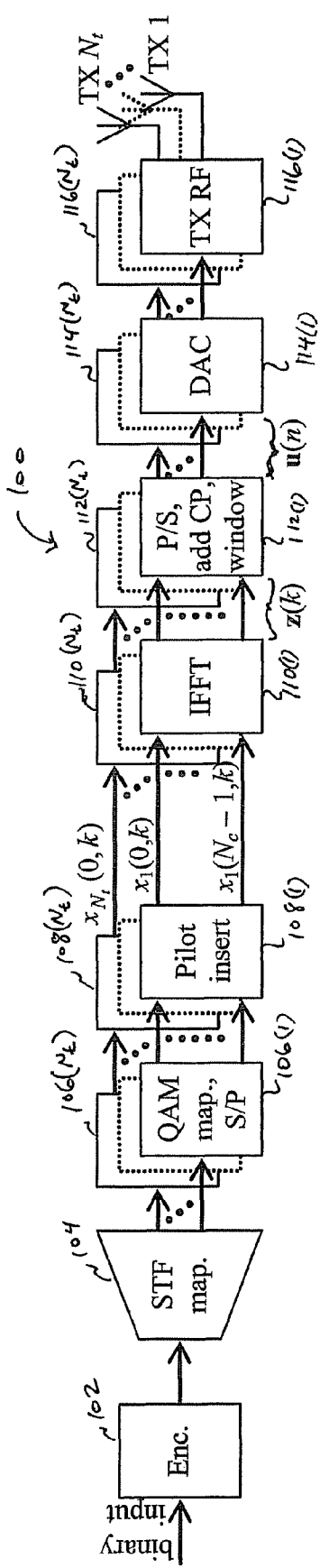
FIG. 1 is a block diagram of a wireless transmitter usable with the present invention.

FIG. 1 is a block diagram of a wireless transmitter 100 that might use pilot tone schemes described herein. As shown, wireless transmitter 100 comprises an encoder 102 with an input for receiving the data to be transmitted to a wireless receiver (or multiple wireless receivers). Encoder 102 might encode data for FEC, encryption, packeting and/or other encodings known for use with wireless transmission. The output of encoder 102 is provided to a mapper 104 that maps the encoded data onto Spatial-Time-Frequency (STF) dimensions of the transmitter. The dimensions represent various constructs that allow for data to be allocated. A given bit or set of bits (which could involve just a grouping of bits, or a set of bits that correspond to a constellation point) is mapped to a particular place among the dimensions. In general, bits and/or signals mapped to different places among the dimensions are transmitted from the transmitter such that they are expected to be, with some probability, differentiable at a receiver.

A spatial stream is transmitted from the transmitter such that the transmissions on different spatial streams are expected to be, with some probability, differentiable at a receiver. For example, bits mapped to one spatial dimension are transmitted as one spatial stream. That spatial stream might be transmitted on its own antenna spatially separate from other antennas, its own orthogonal superposition over a plurality of spatially-separated antennas, its own polarization, etc. Many techniques for spatial stream separation (involving separating antennas in space or other techniques that would allow their signals to be distinguished at a receiver) are known and can be used.

In the example shown in FIG. 1, there are $N_t$ spatial streams (shown with that many antennas, but that need not always be the case). Examples of $N_t$ include 2, 3, 4, 10 or other number greater than one. In some instances, only one spatial stream might be available because of inactivation of the others, but it should be understood that some benefits of schemes described herein only accrue with more than one spatial stream.

Where the transmitter transmits using a plurality of frequency subcarriers, there are multiple values for the frequency dimension, such that mapper 104 might map some bits to one frequency subcarrier and other bits to another frequency subcarrier. The frequency subcarriers used for data might be those specified by an 802.11 standard for data subcarriers. Other frequency subcarriers might be reserved as guard bands, pilot tone subcarriers, or the like that do not (or do not always) carry data. In the example shown in FIG. 1, there are $N_c$ data subcarriers. Examples of $N_c$ include 52, 56, 114, 116 or other numbers greater than one for OFDM. It is possible to use these techniques for single subcarrier systems, such as by having a space-time pilot mapping wherein pilot tones and data are time division multiplexed onto the subcarrier, but the bulk of the examples herein assume a plurality of subcarriers and that would be expected where there is space-time-frequency mapping.

The time dimension refers to symbol periods and different bits might be allocated to different symbol periods. Where there are multiple spatial streams, multiple subcarriers and multiple symbol periods, the transmission for one symbol period might be referred to as an "OFDM (Orthogonal Frequency Division Multiplexing) MIMO (Multiple-Input, Multiple-Output) symbol". A transmission rate for encoded data might be determined by multiplying the number of bits per simple symbol ($\log_2$ of the number of constellations used) times the number of spatial streams times the number of data subcarriers, divided by the length of the symbol period.

Thus, mapper 104 would map bits (or other units of input data) to spatial streams, data subcarriers and symbol periods. As shown in FIG. 1, the separate spatial streams follow separate paths. In some implementations, these $N_t$ paths are implemented with distinct hardware, whereas in other implementations, the path hardware is reused for more than one spatial stream or the path logic is implemented in software that executes for one or more spatial streams. The elements of each of the spatial streams are shown with reference numbers, with instances of similar elements having the same reference number and the instance being indicated parenthetically.

QAM mapper 106 maps the data provided by mapper 104 into constellations. For example, where QAM (quadrature-amplitude modulation) is used, QAM mapper 106 might provided four bits per spatial stream, per data subcarrier, per symbol period and it would output a 16-QAM constellation signal for each spatial stream for each data subcarrier for each symbol period (creating serial-to-parallel (S/P) data paths). Other modulations might be used, such as 64-QAM, which would result in a consumption of six bits per spatial stream, per data subcarrier, per symbol period. Other variations are also possible.

As shown, the outputs of QAM mapper 106 are spread over the spatial and frequency dimensions. A pilot tone inserter 108 inserts pilot tones for the pilot tone subcarriers. The collection of these signals is provided to inverse fast Fourier transform (IFFT) units 110 that convert the frequency signals of the data and inserted pilot tones into time domain signals, represented by the vector z(k) representing the signal over the spatial streams and time-domain samples for the symbol period k.

The time domain signal is then processed by formatters 112 (shown as one per spatial stream), that take the output of IFFT units 110, convert from parallel signals to serial (P/S) add cyclical prefix, guard interval windowing, etc. and then provided as signals (represented by the vector u(n)) to digital-to-analog converters (DACs) 114, which in turn provide analog signals to transmitter radio-frequency (TX RF) blocks that output RF signals to antennas, thereby transmitting the data input to encoder 102 over a wireless medium suitably configured for receipt by wireless receivers.

As is known in the art of MIMO transmissions, transmit diversity gain is a gain at a receiver such that diversity of the transmit streams improves packet error rate (PER) versus signal-to-noise ratio (SNR). Using some of the techniques explained herein, a receiver is better able to characterize the communication channel and/or transmitter impairments and/or receiver impairments such as phase noise and frequency offset, leading to the receiver being better able to decode the transmitted data in the face of distortion of the signal(s) introduced by the communication channel and/or transmitter impairments and/or receiver impairments.

Figure 2:
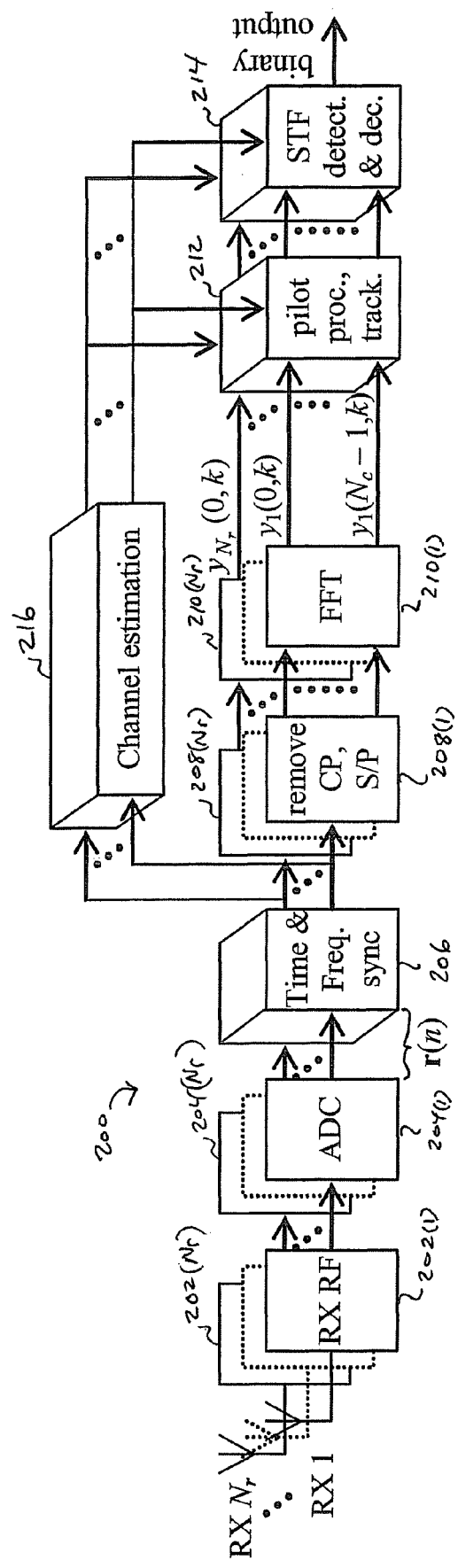
FIG. 2 is a block diagram of a wireless receiver usable with the present invention.

FIG. 2 is a block diagram of a wireless receiver 200 that might receive and use signals from a wireless transmitter such as those described herein. Preferably, wireless receiver 200 is such that it can use pilot tones generated by a wireless transmitter to characterize the channel and/or transmitter impairments and/or receiver impairments and use that characterization to improve receipt of data encoded in the transmissions.

As shown, wireless receiver 200 comprises a plurality of antennas ($N_r$ refers to the number of receive spatial streams, which can be greater than, less than or equal to $N_t$, the number of transmit spatial streams) that feed to $N_r$ receiver radio-frequency (RX RF) blocks 202, which output baseband signals to analog-to-digital converters (ADCs) 204. As with the transmitters, the number of spatial streams processed need not be equal to the number of antennas and each stream need not be limited to one antenna, as various beamsteering, orthogonalization, etc. techniques might be used to arrive at a plurality of receiver streams.

The outputs of ADCs 204 are provided to a sync module 206, which provides its output to various elements that perform the inverse of the elements of the transmitter. For example, a deformatter 208 (shown with one per spatial stream) receives the output of sync module 206, removes prefixes, etc., and parallelizes the data for FFT processing, FFT units 210 convert from the time domain to the frequency domain and a pilot tone processor 212 picks up the frequency domain signals per spatial stream to collectively determine the pilot tones over the spatial streams, frequency subcarriers and groups of symbol periods sent by the transmitter. From that, a detector 214 detects and decodes the data over the various dimensions and outputs the receiver's estimation of what the transmitter sent.

If the receiver knows the transmit sequences sent as part of a total information sequence, the receiver can perform channel estimation with the aid of these known transmit sequences. To assist with proper pilot tone tracking, processing and data detection and decoding, a channel estimation module 216 provides estimation signals to pilot tone processor 212 and detector 214 based on results from sync module 206, or if the deformatting and FFT is the same for the known transmit sequences as for the data portion of the total information sequence, based on results from FFT unit 210.

Figures 3, 4:
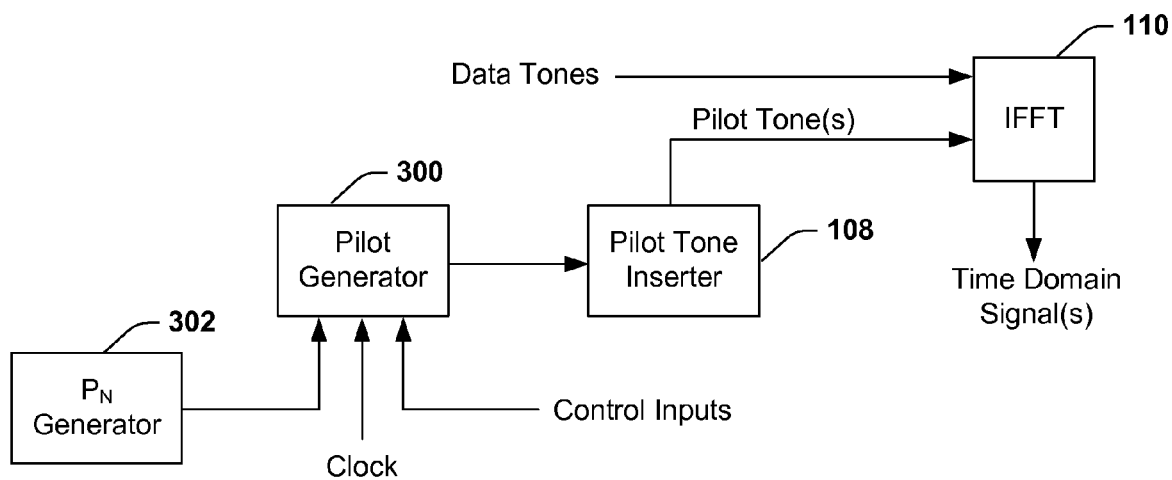
FIG. 3 is a block diagram of a portion of the transmitter of FIG. 1, shown in greater detail.
FIG. 4 provides examples of pilot tone sequence matrices.

FIG. 3 illustrates an example of a portion of a transmitter shown in greater detail. As explained above, data tones (from a QAM mapper or the like) and pilot tones (from a pilot tone inserter) are provided to an IFFT unit. With the data tones and the pilot tones occupying different frequency subcarriers, they are applied to different taps of the IFFT unit and are combined into the appropriate time-domain signal. In this example, the particular pilot tones that are inserted by pilot tone inserter 108 are driven by a pilot tone generator 300. Pilot tone generator 300 determines the amplitude (and possibly the phase) of pilot tones for each spatial stream, each pilot tone (where the transmitter provides for a plurality of pilot tone subcarriers) and for each symbol period.

The values of the pilot tones can be derived from control signals and possibly also a pseudorandom number (PN) generator 302. Thus, in a symbol period, pilot generator 300 would specify an amplitude (and possibly a phase) for each of one or more pilot tones over a plurality of spatial streams. The amplitude might be zero in some cases, meaning that a particular pilot tone for a particular spatial stream might not be transmitted. A set of pilot tone values over a sequence of symbol periods is referred to herein as a pilot tone sequence. In the preferred embodiment, the pilot tone value for a given spatial stream and pilot subcarrier is considered constant over a symbol period and may or may not change from particular symbol period to the next. In such embodiments, the values might be referred to as "pilot symbols". Thus, a pilot generator might comprise logic to determine, for a plurality of spatial streams and a plurality of pilot tone subcarriers, which pilot tone symbols to provide for those streams and subcarriers each symbol period.

Various apparatus and methods for determining the pilot tone sequences are described herein and below in particular. By using a distinguishable set of pilot sequences, the phase noise, frequency offset, and/or transmit channels (or other possible impairments) can be separately estimated per spatial stream. In particular, an orthogonal set of vectors in time can be applied onto multiple spatial streams to distinguish between the different spatial streams and as such be able to benefit from the spatial stream diversity, while having the power distributed equally among the spatial streams. In particular, the orthogonal set of vectors in time can be applied onto multiple transmitter antennas to distinguish between the different transmitter antennas, while having the power distributed equally among the transmitter antennas.

What follows is several examples of methods (and their corresponding apparatus where description is needed) for generating suitable patterns of pilot tone sequences. For some implementations, pilot tone sequences are driven by definitions expressible by matrices. Examples of pilot tone sequence matrices are shown in FIG. 4.

FIG. 4(a) is 2×2 Walsh-Hadamard (WH) matrix, with a first row having the elements (1, 1) and a second row having the elements (1, −1). By convention unless otherwise indicated, the different rows of a matrix correspond to different spatial streams and different columns correspond to different symbol periods. Thus, the pattern of pilot tones for a transmitter with $N_t=2$ would be that pilot tones for each spatial stream would have the same polarity for one symbol period and then would have opposite polarity for the next symbol period. In one approach, the matrix is cyclic and the pilot tone pattern repeats each two symbol periods.

FIG. 4(b) is a 3×4 matrix that might be used with three transmit spatial streams and it cycles over four symbol periods.

FIG. 4(c) is a 4×4 matrix that might be used with four transmit spatial streams and it cycles over four symbol periods.

Let $x_p(n, k)$ denote the pilot symbol transmitted on the p-th transmitter antenna on subcarrier n of a MIMO or multi-transmit OFDM symbol k. For a two-stream MIMO system, $p=\{1, 2\}$ and the value of the pilot tones for subcarrier n are determinable from Table 1. This provides a suitable space-time (ST) mapping.

TABLE 1

| p | k mod 2 = 0 | k mod 2 = 1 |
|---|---|---|
| 1 | 1 | 1 |
| 2 | 1 | −1 |

As shown above, the pilot tones vary over spatial stream and time (e.g., symbol periods) (ST mapping). An orthogonal ST mapping can benefit from the multi-dimensional transmission of a MIMO OFDM system, such that the receiver can combine the orthogonal mapping and benefit from space-time diversity. To achieve this, $x_p(n, k)$ is preferably orthogonal as a function of p and k. Improvements can be had for partially orthogonal mappings, to some extent.

In general, the use of a mapping such that different spatial streams have different sequences and more than one spatial stream has a pilot in a given symbol period provides diversity advantages, such as wherein the pilot tones are nonzero with different phases to provide orthogonality but still survive fading.

Where there are multiple pilot tones per spatial stream, mapping could be done over space-time-frequency (STF mapping) as well. An orthogonal or partially orthogonal STF mapping can provide similar benefits in a MIMO OFDM system. To achieve this, $x_p(n, k)$ is preferably orthogonal as a function of p, k and n. In one approach, the orthogonality in the frequency dimension is provided by using the same mapping matrix, shifted by some column(s). In other approaches, different pilot tones use different matrices or processes to generating pilot tone sequences. For example, a three-dimensional matrix might be used that defines a pattern for different streams, different symbol periods and different pilot tone subcarriers such that the differences between pilot tones are not limited to a time shift of the values in a two-dimensional matrix. With the matrices used, they cycle over symbol periods, but can also cycle over spatial streams and/or frequency, such as where a 2×4 matrix is provided for the first two streams and is duplicated over the next two streams, providing at least second-order diversity.

This definition can be generally extended to any given number of transmit antennas and/or number of pilot tones.

By using a distinguishable set of pilot sequences, the phase noise, frequency offset, and/or transmit channels (or other possible impairments) can be separately estimated per transmitter antenna. In particular, an orthogonal set of vectors in time can be applied onto multiple transmitter antennas to distinguish between the different transmitter antennas and as such be able to benefit from the transmitter diversity, while having the power distributed equally among the transmitter antennas. By having nonzero values for pilot tones over more than one spatial stream, pilot tone tracking can be done continuously even when one stream completely fades.

To prevent spectral lines, the orthogonal pilot sequences could be multiplied by a pseudorandom number (PN) sequence, such as the PN sequence specified by clause 17.3.5.9 of the IEEE 802.11a standard, namely a PN sequence with a generator polynomial of $S(x)=x^7+x^4+1$. The PN sequence might be applied by multiplying the entire pilot mapping matrix by one element of the PN sequence or might be applied by multiplying the pilot mapping with one element of the PN sequence per MIMO OFDM symbol or group of MIMO OFDM symbols. Alternatively, the pilots on every MIMO OFDM symbol or groups of MIMO OFDM symbols could be multiplied with the corresponding element from another PN sequence.

Figure 5:
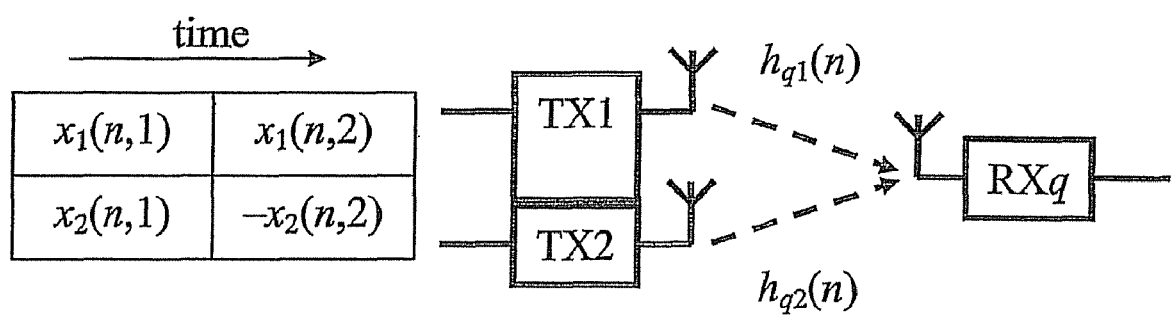
FIG. 5 illustrates a signal that a receiver receives.

As an example, let n be the index of a pilot subcarrier (i.e., its subcarrier number) and transmit symbols are multiplied by an orthogonal set (the 2×2 WH matrix in this example). Then, the q-th receive antenna will observe signals as shown in FIG. 5. The signal received at the receive antenna is $h_{q1}(n)x_1(n,1)+h_{q2}(n)x_2(n,1)$ for the first OFDM symbol and $h_{q1}(n)x_1(n,2)-h_{q2}(n)x_2(n,2)$ for the next OFDM symbol. The Common Phase Noise Error (CPE) per MIMO OFDM symbol can be determined for the q-th receive antenna receiver from knowledge of $h_{q1}(n)$, $h_{q2}(n)$, $x_1(n,1)$, $x_2(n,1)$, $x_1(n,2)$ and $x_2(n,2)$. This knowledge might come from knowing $x_1(n,1)$, $x_2(n,1)$, $x_1(n,2)$ and $x_2(n,2)$ and calculating $h_{q1}(n)$ and $h_{q2}(n)$ at the receiver.

Additionally, transmitter diversity gain can obtained, when $x_1(n,1)=x_1(n,2)$ and $x_2(n,1)=x_2(n,2)$, or when $x_1(n,1)=-x_1(n,2)$ and $x_2(n,1)=-x_2(n,2)$, or when other similar conditions occur, with the CPE assumed equal on two consecutive symbols. Note that with the particular matrix used, if the channels are inverted, such that $h_1(n)=-h_2(n)$, the pilot tones would cancel out when they are equal and would not cancel out for the second symbol, thus allowing for transmitter diversity benefits.

Receiver Processing, for Two Transmit Antennas Suppose $x_1(n,1)=x_2(n,1)=x_1(n,2)=x_2(n,2)=1$ and the CPE on the k-th MIMO OFDM symbol is $\theta(k)$. Then, the signal received at receiver q on subcarrier n for MIMO OFDM symbols 1 and 2 would be:

$$\text{Symbol 1: } y_q(n,1)=(h_{q1}(n)+h_{q2}(n))\exp(j\theta(1)) \quad \text{(Equ. 1)}$$

$$\text{Symbol 2: } y_q(n,2)=(h_{q1}(n)-h_{q2}(n))\exp(j\theta(2)) \quad \text{(Equ. 2)}$$

From that information, the receiver can directly estimate the CPE per MIMO OFDM symbol by multiplying every odd symbol by $(h_{q1}(n)+h_{q2}(n))^*$ and every even symbol by $(h_{q1}(n)-h_{q2}(n))^*$ and determining the angle of the result, where * denotes the conjugate of the corresponding symbol. When the CPE of two consecutive MIMO OFDM symbols is equal, there is the added benefit from the transmit antenna diversity gain in the CPE estimation by determining the angle of $$h_{q1}*(n)(y_q(n,1)+y_q(n,2))+h_{q2}*(n)(y_q(n,1)-y_q(n,2)). \quad \text{(Equ. 3)}$$

The receiver processing described above is usable to obtain the common phase-noise error (CPE) using the pilot as described herein. The processing can also be used for other purposes, such as obtaining or updating channel estimation, frequency offset estimation, etc.

Three/Four Antenna Generalizations

For four transmit antennas, a 4×4 matrix could be used, such as the 4×4 WH matrix shown in FIG. 4(c). Note that this forms an orthogonal set, although other arrangements might work as well. Thus, over the pilots for four symbols, transmit diversity gains can be obtained. Where second-order transmitter diversity is enough, two 2×2 WH matrices can be stacked in space for the four transmitter case.

Other matrices can be used, such as other matrices that provide for an orthogonal basis. For example, a Fourier matrix with size $N_t \times N_t$ (where $N_t$ is the number of TX antennas), although the Fourier matrix does not provide a benefit of the WH matrix in that the latter provides nice constellation points that map onto BSPK.

In the case of three transmit antennas, the first three rows of the 4×4 WH matrix might simply be selected as basis vectors, as in FIG. 4(b). In other variations, the matrix of FIG. 4(d) is used. In this example, when there are only two spatial streams, there is orthogonality after just two symbols, providing benefits earlier than if the orthogonality were only after four symbols, which would be the case where the two spatial streams, for example, used the first and third rows.

With the above, the pilot tones could be such that spectral flatness is preserved, such as where each pilot tone is present, but with a phase shift.

Single Frequency Channels and Multiple Frequency Channels

For a single frequency channel mode, for example a 20 MHz channel mode, with multiple transmitter streams, the subcarrier indices for the pilot tones might be subcarriers −21 and 21, but other positioning might work as well and more than two pilots might be used. For example, four pilots might be used at subcarriers −21, −7, 7, and 21.

For multiple frequency channel modes, such as a 40 MHz mode, the subcarrier indices for the pilot tones might be subcarriers −42, −14, 14 and 42. Using the notation from above, the values prior to the WH matrix might be expressed as:

$$\text{for the 20 MHz case: } x_p(-21,k)=1, x_p(21,k)=1 \quad \text{(Equ. 4)}$$

$$\text{for the 40 MHz case: } x_p(-42,k)=1, x_p(-14,k)=1, x_p(14,k)=1, x_p(21,k)=-1 \quad \text{(Equ. 5)}$$

Optionally, the orthogonal bases could be multiplied by a PN sequence, such as the PN sequence as specified in the 802.11a standard comprising 127 elements, to avoid spectral lines. This also works for more than four pilot tones, such as six pilot tones. For example, six pilots might be used at subcarriers −53, −25, −11, 11, 25 and 53. In that case, a larger matrix could be used, or a smaller matrix cycled around for the additional pilot tones.

In the trivial case of a single transmit antenna, the 20 MHz single transmitter stream mode (with 48 data subcarriers and 4 pilots) might use a conventional 802.11a pilot scheme.

The above allows for antenna diversity, at least due to the changing relationship between transmitted pilot tones. If the same value was used for each pilot tone, then if h1=−h2, fading would remove all signal at the receiver. However, by using the 2×2 WH matrix, the receiver would measure zero for one OFDM burst, then h1+h2 for the second OFDM burst, achieving diversity.

With the above approach, spectral flatness is less of an issue and complete fading is much less likely.

Figure 6:
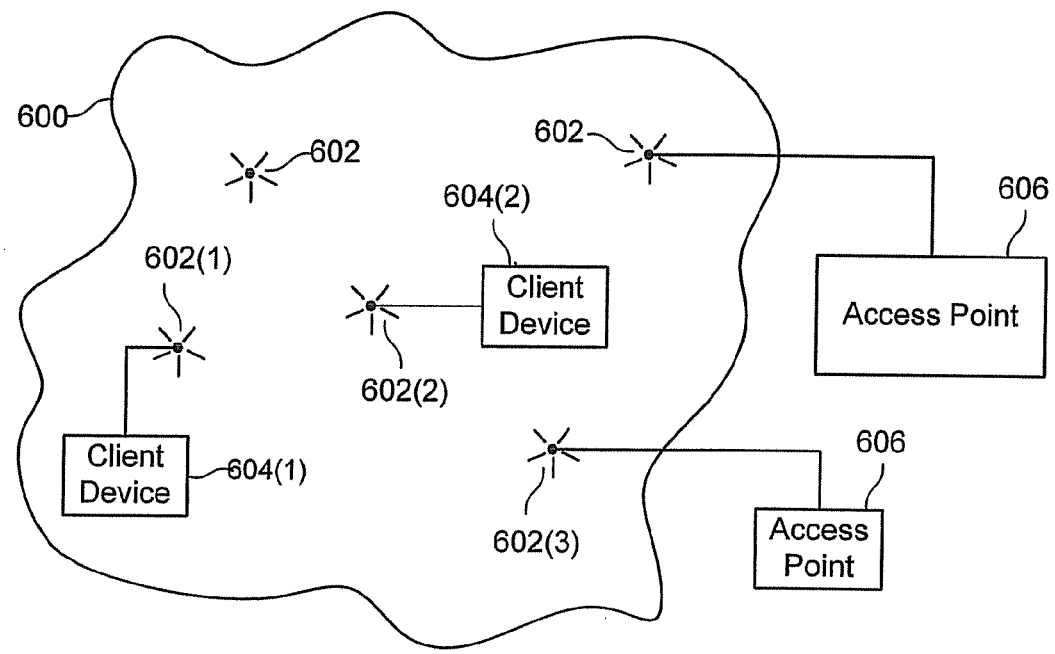
FIG. 6 is a block diagram of a simple wireless network that might use the present invention.

FIG. 6 illustrates a simple wireless network that might use the present invention. For example, the wireless network might be formed of nodes using transmitters and receivers as described herein. As shown in FIG. 6, a wireless network 600 comprises a plurality of stations 602 wherein each station 602 is capable of communicating with at least one other station 602 of wireless network 600. In specific implementations, wireless network 600 is a local area wireless network, as might be used within a building, campus, vehicle or similar environments. In a specific embodiment, wireless network 600 is designed to be compliant with one or more of the IEEE 802.11 standards, such as 802.11a, 802.11b, 802.11g, 802.11n, etc. However, it should be understood that other standards and nonstandard networks might be substituted therefore to solve problems similar to those solved in the 802.11 environment, such as fading, multi-path and the need for multiple spatial streams.

As shown, some of the stations 602 are coupled to client devices 604, while other stations are coupled to access points 606 that interface to distribution systems such as wired local area network (LAN) connections. For example, station 602(1) is coupled to client device 604(1), while station 602(3) is coupled to an access point 606. FIG. 6 is intended to be a simplified and generalized diagram of a wireless network. Interfering signal generators are not shown, but are assumed to be present.

Examples of client devices 604 include laptops, personal digital assistants (PDAs), or any other portable or semi-portable electronic device needing to communicate with other devices, or a stationary electronic device needing to communicate with other devices where a wire connection to a network or the other devices is not available or easily provided. Access points 606 couple their respective stations to a distribution system. Examples of such distribution systems include the Internet, a local area network (LAN) or a public or private connection to a TCP/IP packet network or other packet network or networks.

In a typical operation, a plurality of station devices are outfitted with circuitry and/or software that implements a station 602 functionality and one or more network access points are provided in wireless network 600 to provide access between such a station device and the network to which a wired network interface is coupled. A station coupled to a wired network interface is referred to as an "access point". Just one example of the uses of such a system is to connect computers within a building to a network without requiring network wires to be run to each computer. In that example, the building would be outfitted with stationary access points coupled to the network which are within wireless communication range of wireless network cards in each of the stations coupled to the network.

Figure 7:
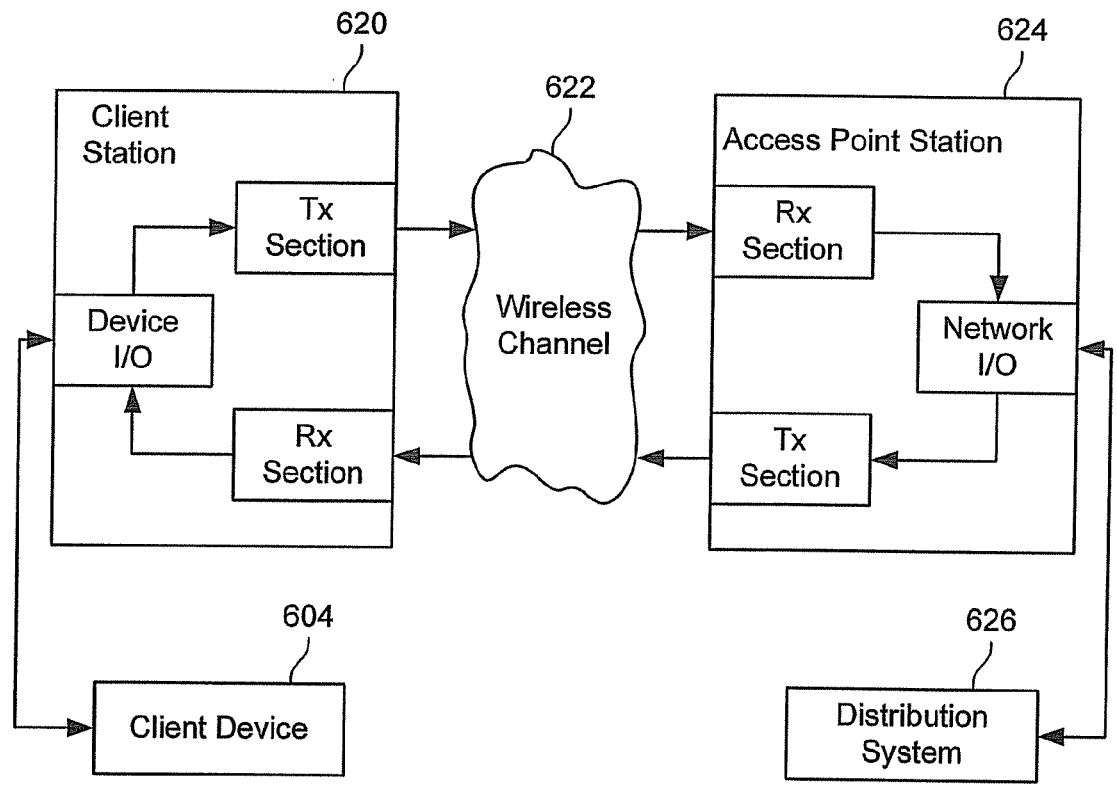
FIG. 7 is a block diagram showing, in more detail, coupling between one device and one network connection of the network shown in FIG. 6.

FIG. 7 shows in more detail the coupling between one device and one network connection. As shown there, client device 604 is coupled to a device I/O section of client station hardware 620. Client station hardware 620 includes a transmit section and a receive section, each coupled to the device I/O section. The transmit section transmits a signal through a wireless channel 622 to a receive section of access point hardware 624. That receive section is coupled to a network I/O section, thus providing a data communication path from client device 604 to a distribution system 626 such as a local area network. A path from distribution system 626 to client device 604 is also provided, via the network I/O section of access point hardware 624, a transmit section of access point hardware 624, a receive section of client station hardware 620 and the device I/O section of client station hardware 620. The characteristics of wireless channel 622 depend on many factors, such as the location of client station hardware 620 and access point hardware 624 as well as intervening objects, such as walls, buildings and natural obstructions, as well as influences by other devices and transmitters and receivers and signal-reflecting surfaces. The stations can be implemented by dedicated hardware, a general purpose processor running station code, or a combination thereof. In the example receivers and transmitters described above, the transmit sections and receive sections can process multiple streams, effecting a MIMO system.

Typically, client station hardware 620 can be integrated in with client device 604. For example, where client device 604 is a laptop computer, client station hardware 620 might be an add-on PCMCIA card that is inserted into the laptop's PCMCIA slot. Typically access point hardware 624 is implemented as part of a wired network interface device that is just used to couple a wired network to a wireless network. Notwithstanding the typical implementation, it should be understood that nothing here prevents the diagram of FIG. 7 from being entirely symmetrical, i.e., wherein client station hardware 620 and access point hardware 624 are nearly identical instances of hardware devices, however in many cases, an access point will be fixed and the station that is not an access point is a portable or mobile device where power usage, cost, weight and/or size are considerations.

A general mechanism described herein is the use of space-time dependency and/or variance of the pilot tone mapping of a MIMO system. For a MIMO OFDM system, the mapping can be extended to include frequency domain dependency and/or variance as well (STF mapping).

As has now been explained, pilot tone symbols to be transmitted can vary over spatial and temporal dimensions and sometimes over the frequency dimension, where the spatial dimension is given by the transmit antennas or spatial information streams at the transmitter, the temporal dimension is defined by subsequent symbols in time, and if OFDM is applied, the frequency dimension is given by the OFDM subcarriers, for example. In preferred instances, such as where more than one nonzero pilot tone is present in a symbol period and/or where the pilot tones are orthogonal or partially orthogonal over one or more dimensions, the benefits of transmit diversity can be obtained by improved channel characterization made possible by use of those pilot tones.

By using mostly nonzero pilot tones and a plurality of pilot tones per symbol period, diversity benefits are obtained. Thus, where at least some pilot tones overlap in some dimensions, using suitable ST or STF mapping, diversity is provided and the receiver is better able to characterize paths, leading to improved recovery of data sent over those paths.

It should be understood that the present invention is not limited to the particular receiver implementations shown herein. In a number of examples, novel apparatus and methods are shown implemented with elements common and widespread in wireless systems today, however it should be understood that the teachings of this disclosure are applicable to other existing, and later developed elements as well, unless indicated otherwise. For example, other values for the pilot tones symbols can be used other than 1 and −1 values, i.e., other phases and even other amplitudes might be used. Instead of matrices driving the sequences, equations or sequences (complex or real) can be used as inputs to a pilot tone generator to generate orthogonal or semi-orthogonal ST or STF mappings. The pilot tones can be QAM constellation points or non-QAM constellation points, inputs, etc.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. In a wireless receiver having a plurality of spatial streams, wherein encoded data is received over a communication channel with pilot tones to provide the receiver with information about the effects of the communication channel or impairments on received spatial streams, a method comprising:
   receiving the plurality of spatial streams;
   identifying a plurality of symbol periods within the spatial streams within which symbols representing some of the encoded data are received;
   determining pilot tone values for the plurality of symbol periods, wherein at least two nonzero pilot tone values are present over two spatial streams in a given symbol period; and
   characterizing the communication channel based on the determined pilot tone values to obtain transmit stream diversity benefits.

2. The method of claim 1, wherein at least some of the plurality of spatial streams are received over a plurality of antennas spaced apart to have different channel characteristics over the communication channel between the receiver and a transmitter.

3. The method of claim 1, further comprising estimating a Common Phase Noise Error (CPE) per symbol given knowledge of the received plurality of spatial streams, the number of the pilot tones is two, and the pilot tone values are identified from a set of the at least two nonzero pilot tone values;
   identifying the pilot tone values according to a 2×2 matrix indicating, for each of two symbol periods from the plurality of symbol periods and the two spatial streams, the pilot tone values for each of the two pilot tones, wherein the 2×2 matrix such that the pilot tone values are nonzero in the two spatial streams for at least one symbol period.

4. The method of claim 3, wherein the 2×2 matrix is reused for a next two symbol periods from the plurality of symbol periods succeeding the two symbol periods.

5. The method of claim 1, wherein the pilot tones are orthogonal over space-time.

6. The method of claim 1, wherein the pilot tones are orthogonal over space-time-frequency.

7. The method of claim 1, wherein at least some of the pilot tones vary over the plurality of symbol periods and at least some of the pilot tones vary over the plurality of spatial streams.

8. The method of claim 1, wherein the pilot tones are altered according to a sequence longer than two elements that is known at the receiver, such that a pattern of the pilot tone values does not repeat every two symbol periods.

9. The method of claim 8, wherein the known sequence is a pseudorandom sequence that is encoded in the pilot tone values to arrive at the pattern of the pilot tone values.

10. The method of claim 9, wherein the pseudorandom sequence is defined by a generator polynomial $S(x)=x7+x4+1$, wherein x is a pilot tone value.

11. A wireless receiver that receives a plurality of spatial streams, wherein encoded data is received over a communication channel with pilot tones to provide the receiver with information about the effects of the communication channel or impairments on the received spatial streams, comprising:
   receive circuitry for receiving the pilot tones and symbols representing the encoded data over the plurality of spatial streams, the symbols allocated within a plurality of symbol periods; and
   a pilot tone processor that determines pilot tone values for the received pilot tones, the pilot tone values provide signals enabling the receiver to characterize the communication channel to obtain transmit diversity benefits, wherein at least two nonzero pilot tone values are present over two spatial streams in a given symbol period.

12. The wireless receiver of claim 11, further comprising a channel estimation module that provides estimation signals to the pilot tone processor.

13. The wireless receiver of claim 11, wherein at least some of the pilot tones vary over the plurality of symbol periods and at least some of the pilot tones vary over the plurality of spatial streams.

14. The wireless receiver of claim 11, wherein the pilot tones are orthogonal over space-time.

15. The wireless receiver of claim 11, wherein the pilot tones are orthogonal over space-time-frequency.

16. The wireless receiver of claim 11, wherein the wireless receiver further comprises a plurality of antennas spaced apart to have different channel characteristics over the communication channel between the receiver and a transmitter and is configured to receive at least some of the plurality of spatial streams over the plurality of antennas.

17. The wireless receiver of claim 11, wherein the pilot tones are altered according to a sequence longer than two elements that is known at the receiver, such that a pattern of the pilot tone values does not repeat every two symbol periods.

18. The wireless receiver of claim 11, wherein the known sequence is a pseudorandom sequence that is encoded in the pilot tone values to arrive at the pattern of the pilot tone values.

19. In a wireless receiver having one or more spatial streams communicable over a communication channel comprising a plurality of paths, wherein encoded data is received over the communication channel with pilot tones to provide the receiver with information about the effects of the communication channel or impairments on the one or more spatial streams, a method comprising:
   receiving symbols representing the encoded data over at least two of the plurality of paths;
   identifying a plurality of symbol periods within which the symbols representing the encoded data are received;
   determining pilot tone values for the plurality of symbol periods, wherein at least two nonzero pilot tone values are received over the at least two of the plurality of paths in a given symbol period; and characterizing the communication channel based on the determined pilot tone values to obtain transmit stream diversity benefits.

20. The method of claim 19, wherein at least some of the plurality of spatial streams are received over a plurality of antennas spaced apart to have different channel characteristics over the communication channel between the receiver and a transmitter.

* * * * *